US010370181B1

(12) United States Patent
Plummer

(10) Patent No.: US 10,370,181 B1
(45) Date of Patent: Aug. 6, 2019

(54) AIR CONDITIONING DRAIN TREATMENT APPARATUS

(71) Applicant: Lucas R. Plummer, Groveland, FL (US)

(72) Inventor: Lucas R. Plummer, Groveland, FL (US)

(73) Assignee: Clear Drain LLC, Minneola, FL (US)

( * ) Notice: Subject to any disclaimer, the term of this patent is extended or adjusted under 35 U.S.C. 154(b) by 0 days.

(21) Appl. No.: 14/453,194

(22) Filed: Aug. 6, 2014

Related U.S. Application Data

(63) Continuation-in-part of application No. 13/222,864, filed on Aug. 31, 2011, now abandoned.

(51) Int. Cl.
  *C02F 1/72* (2006.01)
  *B65D 85/804* (2006.01)
  *C02F 1/68* (2006.01)

(52) U.S. Cl.
  CPC .......... *B65D 85/8043* (2013.01); *C02F 1/687* (2013.01); *C02F 1/688* (2013.01); *C02F 1/722* (2013.01)

(58) Field of Classification Search
  CPC ............ F24F 2221/22; F24F 13/222; F24F 2013/227; F24F 2013/228; C02F 1/688; C02F 1/50; C02F 1/687; B65D 85/8043; B01D 5/009; A01N 25/34
  USPC .......................................... 210/167.11, 206
  See application file for complete search history.

(56) References Cited

U.S. PATENT DOCUMENTS

| 2,885,271 | A | * | 5/1959 | Kersh | 422/263 |
| 3,760,947 | A | * | 9/1973 | Morrison | 210/167.11 |
| 4,217,331 | A | * | 8/1980 | Schaub | B01D 11/00 210/167.11 |
| 4,331,174 | A | * | 5/1982 | King, Sr. | B01F 1/0033 137/268 |
| 5,286,377 | A | * | 2/1994 | Galvan | C02F 1/688 210/198.1 |
| 5,402,813 | A | * | 4/1995 | Keen | 137/15.16 |
| 5,514,344 | A | | 5/1996 | D'Agaro | |
| 5,651,880 | A | * | 7/1997 | Johnson | B01F 1/0033 210/126 |
| 5,722,458 | A | | 3/1998 | Potter | |
| 5,885,446 | A | * | 3/1999 | McGrew, Jr. | 210/91 |
| 5,932,093 | A | | 8/1999 | Chulick | |
| 5,975,113 | A | | 11/1999 | Haining et al. | |
| 6,487,867 | B1 | | 12/2002 | Herren | |
| 6,517,727 | B2 | | 2/2003 | Pickens | |
| 6,550,264 | B1 | | 4/2003 | Cantolino | |

(Continued)

*Primary Examiner* — Angelisa L. Hicks
(74) *Attorney, Agent, or Firm* — Larry D. Johnson

(57) ABSTRACT

A treatment apparatus for air conditioning and refrigeration system drains includes a body portion having an inlet, outlet, upwardly extending neck portion, and downwardly-depending reservoir extending below the inlet and outlet. The apparatus is installed with the inlet and outlet interposed in air conditioning drain line. A chemical insert cartridge is installed into the central cavity of the body. The cartridge includes a shell with a plurality of openings, and contains a quantity of biocide such as one or more biocide tablets, so that the tablets dissolve through the openings in the shell when exposed to the water in the drain line. As the drain water passes through the apparatus the biocide is released into the drain water, preventing algae growth and discouraging insects and pests from occupying the drain line.

5 Claims, 2 Drawing Sheets

(56) References Cited

U.S. PATENT DOCUMENTS

| | | |
|---|---|---|
| 6,651,690 B1 | 11/2003 | Coogle |
| 6,701,740 B1 | 3/2004 | Hernandez-Zelaya |
| 6,892,907 B2 | 5/2005 | Varney |
| 7,392,658 B1 | 7/2008 | Hardy, III |
| 7,392,821 B2 | 7/2008 | Nakata et al. |
| 7,686,034 B1 | 3/2010 | Coogle |
| 2002/0014178 A1* | 2/2002 | Haught .................. A01N 37/40 106/15.05 |
| 2006/0096307 A1 | 5/2006 | Coogle |
| 2007/0119503 A1 | 5/2007 | Scaringe |

* cited by examiner

AIR CONDITIONING DRAIN TREATMENT APPARATUS

CROSS REFERENCE TO RELATED APPLICATIONS

The present application is a continuation-in-part of Ser. No. 13/222,864 filed Aug. 31, 2011, which claims the benefit of the filing date of U.S. Provisional Patent Application Ser. No. 61/378,626, filed Aug. 31, 2010. The foregoing applications are incorporated by reference in their entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to air conditioning and refrigeration equipment, and more particularly to an automatic, non-mechanical treatment apparatus for air conditioning and refrigeration systems drain lines to prevent the growth of algae and mold, and deter pests and other organisms from the drain line.

BACKGROUND INFORMATION AND DISCUSSION OF RELATED ART

Air conditioning and refrigeration drain lines are typically installed in a manner that may permit drain water to stand in the line for extended periods of time. When the drain water is not continuously circulated and is instead allowed to stand in the drain pipe, algae and mold can grow and/or insects or other pests (frogs, lizards, wasps, etc.) can enter and clog the drain line. This clog may cause the drain system to back up and overflow, causing potentially serious damage to the building area where the air handler or refrigeration unit is located. This water backup can also cause the system to shut down or cause serious equipment damage.

U.S. Pat. No. 5,514,344 to D'Agaro discloses a solution dispenser for air conditioning microorganism control. Microorganism growth within water chambers of air conditioning systems is controlled by the periodic introduction of minute quantities of biocidal materials. A large volume reservoir holds a concentrated solution of biocidal material. A pump, fed from the reservoir, pumps the solution through a tube to the water chamber. The pump is actuated for very short duration periods so that only a very small volume of the solution is dispensed. The time interval between periods is very long so that the biocide concentration in the water chamber is renewed as required. The duration of the pumping periods and the time interval between periods are adjustable by controls in a timer. A normally closed check valve in the line keeps the line full between periods. An anti-siphon mechanism is provided in the line when it branches. An alarm mechanism is optionally provided to warn when the reservoir solution is depleted.

U.S. Pat. No. 5,722,458 to Potter describes a valve assembly which is placed in an air conditioner drain line for cleaning and maintenance of the drain line. The valve may be positioned to permit water or condensate to run through the drain line to a sewage drain. When the line needs to be serviced, usually due to clogging, the valve plug can be rotated to seal off the drain line upstream or downstream of the valve assembly. A slight pressure or vacuum may then be introduced at the top of the valve to force clogs loose. The valve also has a receptacle at the bottom so that an anti-fungus pellet may be dropped in which inhibits the fungus growth.

U.S. Pat. No. 5,975,113 to Haining, et al. teaches a dispenser for tableted chemical treatment material into an air conditioner condensate pan drain line and comprises a container for the tablets and a removable cover sealed to the container by a gasket. The cover includes legs that extend into the container to prevent the tableted material from floating upward and blocking the inlet and outlet to the container. The container is secured in the drain line by conduits on either end.

U.S. Pat. No. 6,487,867 to Herren discloses an automated apparatus for periodically transferring a pre-selected volume of treatment liquid to a collection pan in order to treat and prevent the clogging of the collection pan. The system includes a treatment liquid reservoir, at least one fluidic coupling, and a structure for enabling the periodic transfer of the volume of treatment liquid from the treatment liquid reservoir to the collection pan by way of the fluidic couplings, causing a treating of the collection pan.

U.S. Pat. No. 6,651,690 to Coogle describes a system for releasing growth inhibiting chemicals downstream in an air conditioner drain assembly. The system also allows a user to vary the concentration and time for releasing the growth inhibitor chemical. A main elongated tubular member is perpendicularly connected with inlet and outlet tubular members that include rotatably mounted female connectors that are removably connected with threaded male connectors. The latter in turn are connected to upstream and downstream drain pipe lines.

U.S. Pat. No. 6,892,907 to Varney teaches a device for holding and dispensing a fluid for decontaminating a condensate drip pan of an air conditioner and includes: a vessel at one end of the device for holding the fluid; and at least one fluid line having a first end inserted in a lower end of the vessel, and an opposite, lower, second end inserted in the drip or drain pan; a flow control device on the fluid line for controlling a rate of fluid drip from the fluid line into the drip or drain pan; and a drip chamber in the fluid line.

U.S. Pat. No. 7,392,658 to Hardy, III discloses a cleaning system for an air conditioner which injects a biocide followed at regular intervals, which may be followed by a rinsing flush.

U.S. Pat. No. 7,392,821 to Nakata, et al. describes a drain water discharge structure for an air conditioning apparatus in which at least any one of an internal drain pipe and an external drain pipe is formed from an antibacterial metal pipe, thereby to inhibit the generation of slime in the external drain pipe and to make the external drain pipe less apt to deterioration.

U.S. Pat. No. 7,686,034 to Coogle teaches an apparatus which applies chemicals to condensate water from an air conditioning condensate tray. It has an elongate body and a central cavity enclosed by an encircling wall. The central cavity receives chemicals to prevent the growth of microorganisms. A first tubular member is operatively connected at a first end to an aperture in the wall, and a second end extending outwardly for receiving condensate water from the condensate tray. A second tubular member is operatively connected to a second aperture in the wall opposite the first aperture aligned with the first member so that a cleaning brush may be passed through both members and into the condensate tray. Below the two tubular members a fluid outlet is provided with a connector for joining to a drainage system for draining the chemically treated condensate water from the cavity.

United States Patent Application 20060096307 by Coogle discloses a chemical delivery system for inhibiting growth in condensate drainage pipe of an air conditioner and includes a reservoir body having an open upper end, an opposing open lower end and a central cavity; an inlet tubular connector mounted perpendicularly to the reservoir body adjacent to the open upper end of reservoir body; an outlet tubular connector mounted perpendicularly to the reservoir body between the inlet tubular connector and the lower end of the reservoir body; a liquid level sensor disposed within the outlet tubular connector; a tubular cleaning spout having one end mounted perpendicularly to the reservoir body opposing the inlet tubular connector, an opposing spout opening, and a removable spout cap; a removable top cap; and a bottom cap removably connected to the open lower end of the reservoir body; thereby closing the central cavity for receiving a grown inhibiting chemical.

United States Patent Application 20070119503 by Scaringe describes a method and apparatus to prevent clogging of condensate drain lines with a biocide delivery system that prevents the growth of bioorganic growth in the liquid trap using time release biocide tablets or liquid biocide. When using solid biocide tablets erosion and dissolution of the tablets is reduced. When using liquid biocides, combination of initial release followed by gradual release of residual liquid biocide in the drain water is attainable. Drain line are promoted from clogging while being installed anywhere on the drain line upstream of the liquid trap. The apparatus can also be incorporated with a liquid trap, allowing placement anywhere in the drain line.

The foregoing patents and applications reflect the current state of the art of which the present inventor is aware. Reference to, and discussion of, these patents and applications is intended to aid in discharging Applicant's acknowledged duty of candor in disclosing information that may be relevant to the examination of claims to the present invention. However, it is respectfully submitted that none of the above-indicated patents or applications disclose, teach, suggest, show, or otherwise render obvious, either singly or when considered in combination, the invention described and claimed herein.

SUMMARY OF THE INVENTION

The present invention provides an improved treatment apparatus for air conditioning and refrigeration system drains. The apparatus includes a body portion having an inlet, outlet, upwardly extending neck portion, and downwardly-depending reservoir extending below the inlet and outlet. The apparatus is installed with the inlet and outlet interposed in air conditioning drain line. A chemical insert cartridge is installed into the central cavity of the body. The cartridge includes a shell with a plurality of openings, and contains a quantity of biocide such as one or more biocide tablets, so that the tablets dissolve through the openings in the shell when exposed to the water in the drain line. As the drain water passes through the apparatus the biocide is released into the drain water, preventing algae growth and discouraging insects and pests from occupying the drain line.

The inventive apparatus is a non-mechanical system with no moving parts or electrical requirements. Biocide capacity of the system in a typical installation is such that a normal residential air conditioning unit should not require maintenance or replacement for months, depending upon amount of use. The inventive treatment apparatus should be installed in the drain line as close as possible to the air conditioning air handler or the refrigeration unit to permit the entire downstream drain system to be treated.

It is therefore an object of the present invention to provide a new and improved treatment apparatus for air conditioning and refrigeration system drains.

It is another object of the present invention to provide a new and improved treatment apparatus that prevents algae growth and discourages insects and pests from occupying the drain line.

A further object or feature of the present invention is a new and improved treatment apparatus for air conditioning and refrigeration systems that is non-mechanical and with no moving parts or electrical requirements.

An even further object of the present invention is to provide a novel treatment apparatus for air conditioning and refrigeration systems that uses the existing drain system and standard chemical tablets that are readily available in the marketplace.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
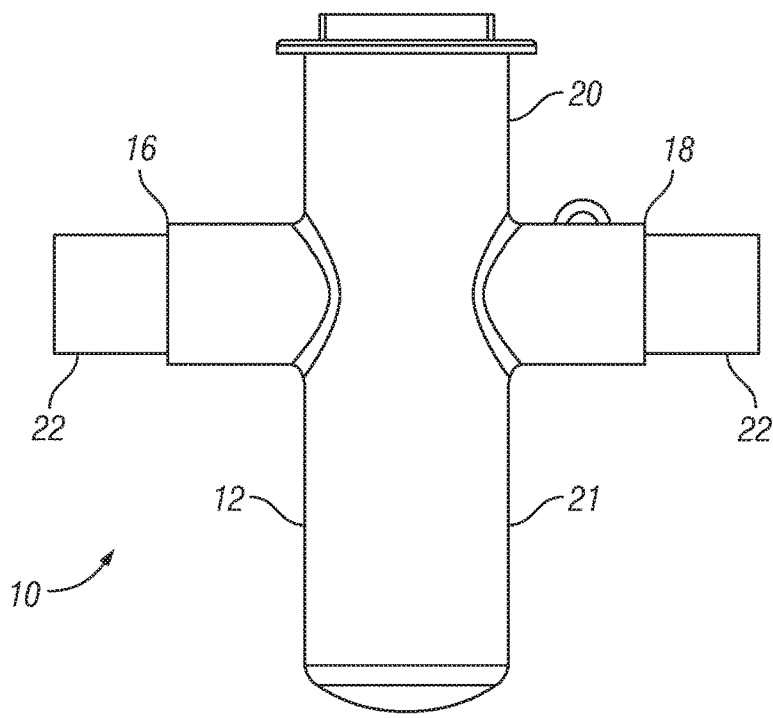
FIG. 1 is a front elevation view of an air conditioning drain treatment apparatus of this invention.
Figure 2:
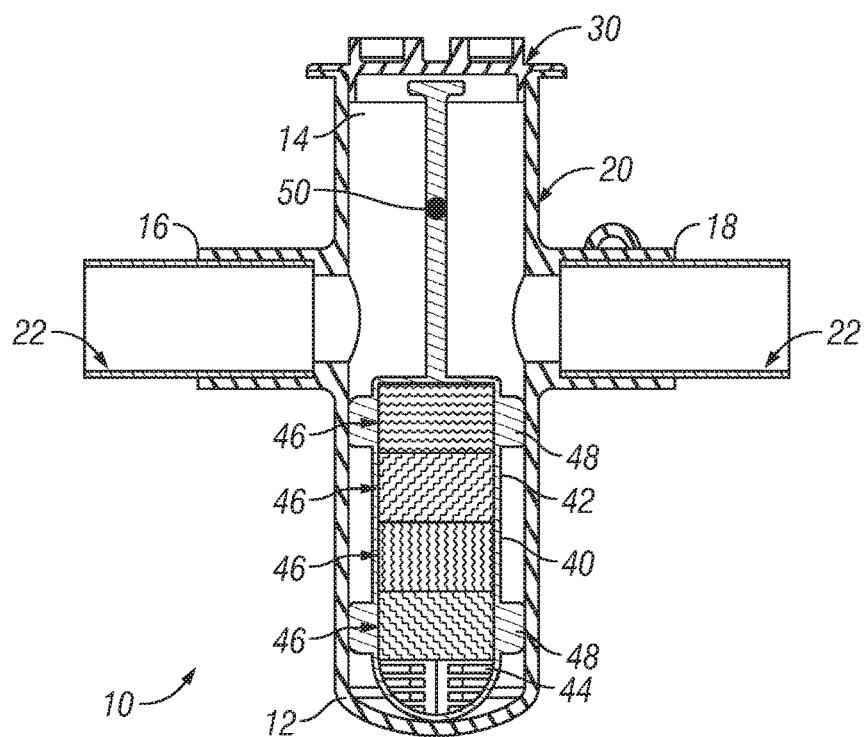
FIG. 2 is a sectional view showing a chemical insert cartridge as installed into the body of the apparatus.
Figure 3:
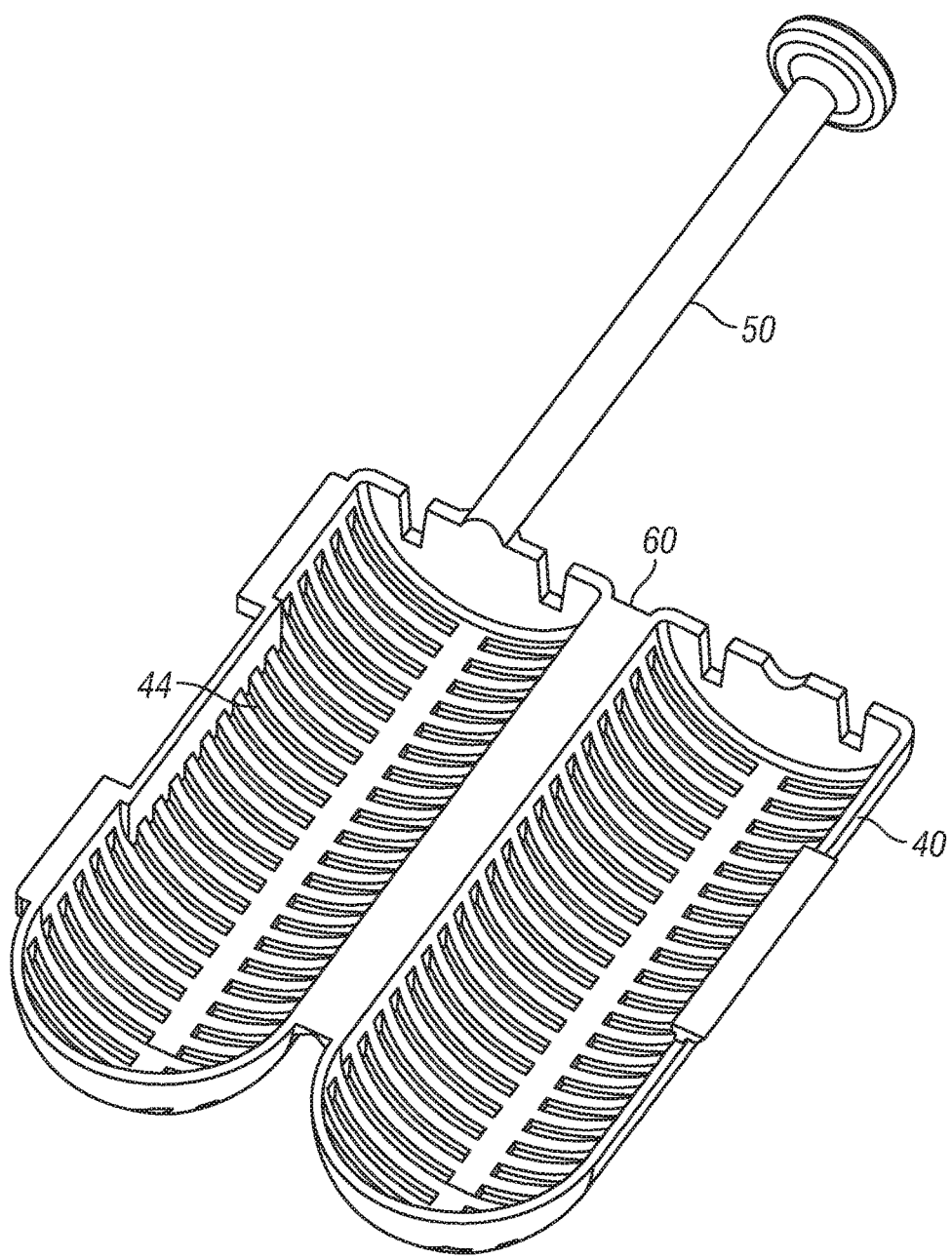
FIG. 3 is a perspective view of a chemical insert cartridge.

Referring to FIGS. 1-3, there is illustrated therein a new and improved air conditioning drain treatment apparatus, generally denominated 10 herein. FIG. 1 is a front elevation view of one embodiment of the apparatus. The apparatus includes a body portion 12 having an inlet 16, outlet 18, upwardly extending neck portion 20, and downwardly-depending reservoir 21 extending below the inlet and outlet. The apparatus is installed with inlet 16 and outlet 18 interposed in air conditioning drain line 22.

FIG. 2 is a sectional view showing a chemical insert cartridge 40 as installed into the central cavity 14 of body 12 of the apparatus. Cartridge 40 includes a shell 42 with a plurality of openings 44, and contains a quantity of biocide such as one or more biocide tablets 46. In the preferred embodiment, tablets 46 may be biocide gel tabs manufactured by Nu-Calgon Wholesaler, Inc. of St. Louis, Mo., containing n-Alkyl (60% C14, 30% C16, 5% C12, 5% C18) dimethyl benzyl ammonium chloride as the active ingredient. When activated by contact with the drain water, the tablets turn to gel and lock in place. The tablets are designed to completely dissolve at an even rate over a period of months. In one example, four "3-ton" tablets are placed in the shell and would last for approximately 4-6 months with typical air conditioner use.

One or a plurality of stand-offs 48 extend radially outward from the shell 42 and serve to center the shell in the central cavity 14 of the body so as to facilitate drain water in the drain line to enter the shell through the openings 44 to contact and activate the biocide. Shaft 50 extends upwardly from the shell 42 and into the neck 20, and serves to ensure that the shell is fully positioned in the reservoir so that the shell and biocide are exposed to water when there is water in the drain line, and also to facilitate grasping of the cartridge by the user for removal and replacement. Removable cap 30 releasably seals the cartridge 40 in the body 12 and prevents the release of chemical fumes, but facilitates removal of the cartridge for periodic replacement. An optional trap (e.g., a ¾" V-trap) may be installed in the drain line adjacent the inlet 16 to prevent upstream release of chemical fumes.

FIG. 3 is a perspective view of a chemical insert cartridge 40. In this embodiment, the cartridge is constructed as a clamshell 60 into which the biocide (such as tablets 46) is placed, and the clamshell closed and sealed by the manufacturer. In this manner, the user does not ever need to contact the biocide material directly, but rather can simply remove and dispose of the used cartridge when the biocide is depleted, and replace it with a new cartridge.

An alternate embodiment of the apparatus may be constructed of PVC or other suitable material, and may be in the form of a 6"×1¼" molded uni-body with a ¾" inlet and outlet for connection to typical ¾" drain pipe, an 8½"×1" tablet tube (to accommodate 10-12 1" chemical tablets) with ⅛" slots or ⅜" holes (or other size orifices, depending on the desired rate of biocide release), and a 1¼" cap. In this configuration, the tablet tube or sleeve preferably includes a seal or plug below the slots or holes to retain the chemical tablets in the sleeve, or may be pre-formed with a closed bottom end below the slots.

A further alternate embodiment of the apparatus may be constructed from readily available PVC stock, such as a body made from a 1¼" cross fitting with two 1¼"×¾" reducers for the inlet and outlet, a 1¼" plug glued into the bottom of the cross fitting, and an 8"×1¼" tube glued into the top of the cross fitting for the neck. Dimensions may of course vary depending on particular applications, desired tablet capacity, installation clearances, and the like. All or portions of the apparatus (such as the neck and sleeve) may be made of transparent material to facilitate viewing of the supply of chemical tablets.

These alternate embodiments may use chemical tablets such as standard one inch chlorination tablets of the type used in spas and swimming pools. Alternatively, bromine, sodium carbonate peroxyhydrate, or other antimicrobial material may be used, in any size tablet or tablets. Salt tablets may also be used if appropriate in certain applications, and would not require the optional upstream trap.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An automatic, non-mechanical apparatus for treating drain water in air conditioning and refrigeration system condensate drain lines, said apparatus comprising:
   a body portion having a central cavity with an inlet and outlet interposed in a condensate drain line carrying drain water, an upwardly extending neck portion, and a downwardly-depending reservoir extending below said inlet and outlet;
   a cartridge including a shell positioned in said downwardly-depending reservoir, said shell having a plurality of openings, a plurality of stand-offs extending radially outward from said openings to center said shell and said openings in said downwardly-depending reservoir and below said inlet and outlet, and containing a quantity of biocide, and an upwardly-extending shaft positioning said cartridge in said body portion, wherein said stand-offs facilitate passage of drain water in the drain line into said shell through said openings in said shell to release biocide into the drain water in the drain line to prevent algae growth, and said cartridge is substantially non-moving during operation.

2. The treatment apparatus of claim 1 including a cap to releasably seal said cartridge in said body portion.

3. The treatment apparatus of claim 1 wherein said biocide comprises gel tablets.

4. The treatment apparatus of claim 1 wherein said biocide comprises n-Alkyl (60% C14, 30% C16, 5% C12, 5% C18) dimethyl benzyl ammonium chloride as the active ingredient.

5. The treatment apparatus of claim 1 wherein said cartridge is constructed as a clamshell into which biocide is placed, and said clamshell is closed and sealed.

* * * * *